United States Patent

Harada et al.

[11] Patent Number: 6,065,377
[45] Date of Patent: May 23, 2000

[54] METHOD OF CUTTING HARDENED STEEL WITH HIGH ACCURACY

[75] Inventors: Takashi Harada; Tetsuo Nakai; Tomohiro Fukaya; Junichi Shiraishi, all of Itami, Japan

[73] Assignee: Sumitomo Electric Industries, Ltd., Osaka, Japan

[21] Appl. No.: 09/175,968

[22] Filed: Oct. 21, 1998

[30] Foreign Application Priority Data

Oct. 21, 1997 [JP] Japan .................................... 9-288599
Sep. 28, 1998 [JP] Japan .................................. 10-272843

[51] Int. Cl.[7] ...................................................... B23B 3/00
[52] U.S. Cl. ............................. 82/1.11; 407/118; 407/119
[58] Field of Search .............................. 82/1.11; 407/118, 407/119

[56] References Cited

U.S. PATENT DOCUMENTS

| | | | |
|---|---|---|---|
| 5,238,334 | 8/1993 | Brandt | 407/119 |
| 5,331,871 | 7/1994 | Viens | 82/1.11 |
| 5,404,741 | 4/1995 | Borttscheller et al. | 83/349 |
| 5,878,496 | 3/1999 | Liu et al. | 29/407.01 |

FOREIGN PATENT DOCUMENTS

| | | |
|---|---|---|
| 0 346 505 A1 | 12/1989 | European Pat. Off. . |
| 57-205002 | 12/1982 | Japan . |
| 6-55301 | 3/1994 | Japan . |
| 1 340 906 | 9/1987 | U.S.S.R. . |

*Primary Examiner*—Anthony Knight
*Assistant Examiner*—Mark Williams
*Attorney, Agent, or Firm*—McDermott, Will & Emery

[57] ABSTRACT

A method of cutting hardened steel using a cBN sintered tool which can improve the surface roughness while maintaining high dimensional accuracy. The upper limit of the tool feed rate is set at such a value that a theoretical surface roughness calculated from the feed rate is between 2/3 and 1/1000 of the target surface roughness. The amount of change of the feed rate between the upper and lower limits of the tool feed rate is set to be between 0.002 and 0.05 mm/rev, and the amount of every feed rate change is set not to be equal to the original feed rate multiplied by an integer. The feed rate is changed forcibly for every number of workpieces for which the total cutting length is between 10 and 1000 meters.

4 Claims, 2 Drawing Sheets

METHOD OF CUTTING HARDENED STEEL WITH HIGH ACCURACY

BACKGROUND OF THE INVENTION

This invention relates to a method of cutting hardened steel with high accuracy using a tool made of cBN sintered body.

As a method of preventing deterioration of roughness of a finished surface due to notch wear of a tool during cutting, unexamined Japanese patent publication 57-205002 discloses a cutting method in which the feed rate is changed within a predetermined range during the time period from the start to the end of cutting of a cutting surface for which uniform surface roughness is required. Unexamined Japanese patent publication 6-55301 discloses a control method for an NC cutting machine in which the feed rate of the tool cutting edge is changed within a predetermined range in each cutting cycle.

These methods are effective for the cutting of relatively soft workpieces, but will encounter the following problems in high-accuracy machining of a hardened steel having high hardness (HRc 50-65).

To be of high accuracy is to have a finished surface roughness of 3.2s (÷3.2z) or less and to have a finished dimensional error of IT7 class or less. These two requirements have to be met. With the above method, if the workpiece is a hardened steel, dimensional accuracy does not stabilize.

Cutting of hardened steel is rather special compared with cutting of other materials. For example, the radial force that acts on the tool is large. This tendency becomes remarkable with the progression of wear of the tool.

If the feed rate is changed substantially under such circumstances, the radial force also changes significantly, thus decreasing the dimensional accuracy.

In the method of unexamined Japanese patent publication 57-205002, the feed rate is changed in the surface for which uniform surface roughness is required. Thus, dimensional changes tend to occur in the same surface due to changes in the radial force. In the method of unexamined Japanese patent publication 6-55301, the width of change in the feed rate is set not taking the radial force into consideration. That is, the feed rate is changed between the lower limit, which is the permissible limit of the extension of machining time due to the narrowing of width of the feed rate change, and the upper limit, which is the permissible limit of decrease in surface roughness due to the widening of the change width. Thus, during cutting of hardened steel, the radial force may change excessively. Also, no clear standard is determined for the timing of changing the feed rate. Thus, the surface roughness frequently does not improve as expected even if the feed rate is changed. Further, no attention is given to the shape of the tool used. Thus, the shape of the tool tends to be another cause of unstable dimensional accuracy.

An object of this invention is to provide a method of cutting hardened steel using a cBN sintered tool which can improve the surface roughness while maintaining high dimensional accuracy.

SUMMARY OF THE INVENTION

According to this invention, there is provided a method of cutting hardened steel by using a CBN sintered tool to achieve a target surface roughness of 3.2s or less and a dimensional tolerance of IT7 class or higher, characterized in that the upper limit of the tool feed rate is set at such a value that a theoretical surface roughness calculated from the feed rate is between 2/3 and 1/1000 of the intended surface roughness, with the difference between the upper and lower limits of the tool feed rate between 0.002 mm/rev and 0.05 mm/rev, and the amount of each feed rate change being not equal to the original feed rate multiplied by an integer, the feed rate being changed forcibly for every number of workpieces for which the sum of cutting length of each workpiece is between 10 and 1000 meters.

In this method, better results can be achieved if a cBN sintered tool is used which has a normal wedge angle of between 60 and 120 degrees or which has a straight end cutting edge extending from the nose and having an end cutting edge angle of 0.5 to 4 degrees. It is preferable that if the end cutting edge has a length of 0.001 mm to 1 mm, the end cutting edge angle be from −0.01 degree to 0.4 degree.

On the finished surface, protrusions and recesses are formed at intervals corresponding to the tool feed rate. The cutting edge suffers notch wear because one same portion of the cutting edge is repeatedly brought into contact with the protrusions of the finished surface.

Thus, if the feed rate is changed forcibly to shift the positional relation between the cutting edge and the protrusions on the finished surface, it is possible to suppress notch wear. This approach is already proposed in unexamined Japanese patent publications 57-205002 and 6-55301. But this solution itself cannot stabilize the surface roughness or dimensional accuracy during cutting of hardened steel.

Thus, the following measures are additionally taken in this invention.

If the feed rate is changed by an amount equal to the original feed rate multiplied by an integer, one same portion of the cutting edge may keep abutting the protrusions of the finished surface even if the feed rate has been changed. Thus, the feed rate should be changed by an amount that is not equal to the original feed rate multiplied by an integer to effectively suppress notch wear. If the feed rate is changed some times until the feed rate returns to the original value and this pattern is repeated, the feed rate should be set so as not to be equal to the original feed rate multiplied by an integer until one pattern is finished.

If the feed rate is set at such a value that the theoretical surface roughness calculated from the feed rate (given by $f^2/8R$, wherein f is the feed rate, and R is the nose radius of the tool) is greater than 2/3 of the target surface roughness, the target surface roughness may not be achievable due to deterioration of the surface roughness resulting from disturbance. On the other hand, if the feed rate is set at such a small value that the theoretical surface roughness is less than 1/1000 of the target surface roughness, though the surface roughness will improve, the cutting length per workpiece will increase, thus reducing the number of workpieces one tool can machine before its life expires. Thus, the upper limit of the feed rate should be determined such that the theoretical surface roughness calculated from the feed rate is between 2/3 and 1/1000 of the target surface roughness.

For the cutting of hardened steel, since the radial force tends to change markedly with change in the feed rate, the width of change in the feed rate is limited to a narrow range. If the width of change is smaller than 0.002 mm/rev, no suppression of notch wear due to the feed rate change will be achievable. On the other hand, if the feed rate is changed by more than 0.05 mm/rev, this will have a bad influence on the dimensional accuracy. Thus, the feed rate should be changed within a width range between 0.002 mm/rev and 0.05 mm/rev. By changing the feed rate every time a predetermined number of workpieces for which the total cutting length (or sum of the cutting lengths) is between 10 and 1000 meters have been cut, it is possible to minimize the notch wear and maintain high cylindricality of workpieces.

With a tool of cBN sintered body, if the normal wedge angle βn shown in FIG. 1A is less than 60°, the cutting edge tends to chip due to insufficient strength, thus worsening the surface roughness. On the other hand, if the normal wedge angle βn is more than 120°, tool sharpness drops, thus increasing the cutting force. This increases dimensional error.

As shown in FIG. 1B, if a straight end cutting edge 2b extending from a nose R2a is provided at the tip of the cutting edge, the surface roughness will improve due to flattening effect by the end cutting edge 2b. If the end cutting edge angle κ' of the end cutting edge 2b is greater than 4 degrees, it will not be involved in cutting and thus provide no flattening effect. On the other hand, if the angle κ' is smaller than 0.5 degree, the cutting force will increase to such an extent as to make it difficult to provide stable surface roughness and dimensional accuracy.

Further, if the end cutting edge has a length between 0.001 mm and 1 mm, the increase in the cutting force due to the provision of the end cutting edge is minimum. Thus, it is possible to make smaller the end cutting edge angle κ'. If the angle κ' is between −0.01 and 4 degrees, better results are obtainable.

By these measures, cutting can be performed for a long time while maintaining good surface roughness and dimensional accuracy.

Other features and objects of the present invention will become apparent from the following description made with reference to the accompanying drawings, in which:

DETAILED DESCRIPTION OF THE PREFERRED EMBODIMENT (Example 1)

A hardened steel (having a hardness HRc 60) was cut for the target surface roughness of 3.2s (÷3.2z) and dimensional accuracy of IT7 class while forcibly changing the feed. The radius R of nose of the tool edge was 0.8 mm. The cutting type was the cutting of the outer periphery of a 30 mm dia.×65 mm round rod. Cutting was performed with two kinds of feeds, i.e. a constant feed of 0.08 mm/rev, and a feed in which the feed rate was forcibly changed by 0.02 mm/rev with the upper limit of 0.09 mm/rev. Specifically, the feed rate was repeatedly changed for every five workpieces (total cutting length for five workpieces being about 380 meters) as follows: 0.09→0.08→0.07→0.09→ . . . (in mm/rev).

Figure 1A:
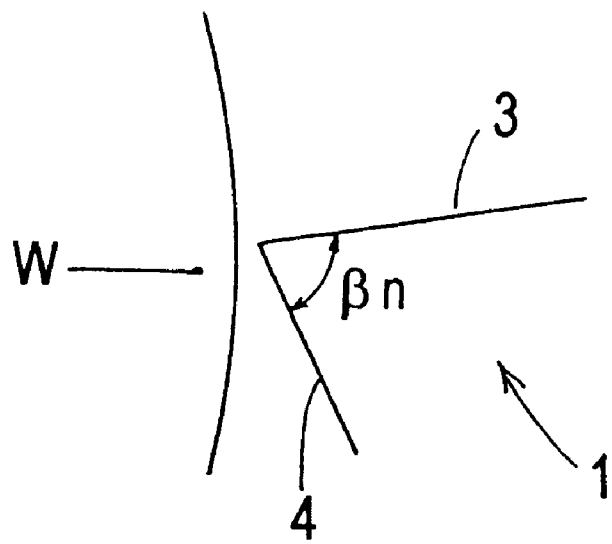
FIG. 1A is a view of a tool as viewed in the feed direction of the tool and showing the normal wedge angle.
Figure 1B:
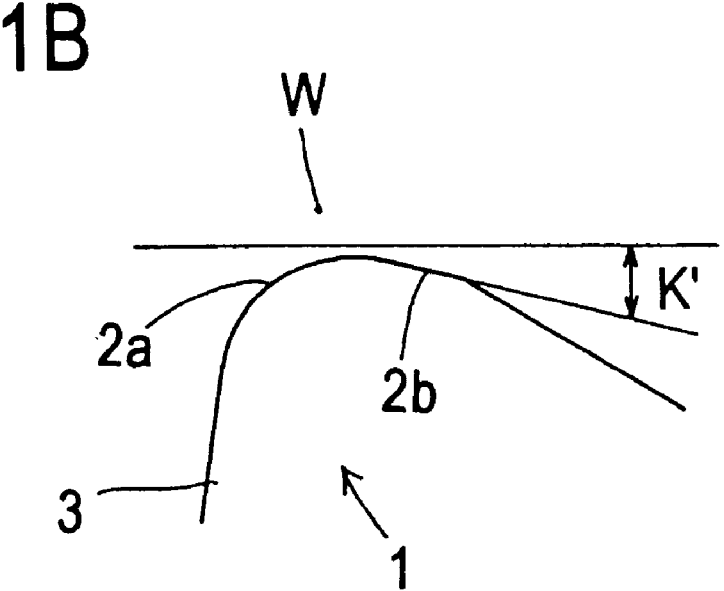
FIG. 1B is a plan view of a tool having a straight end cutting edge.
Figure 2:
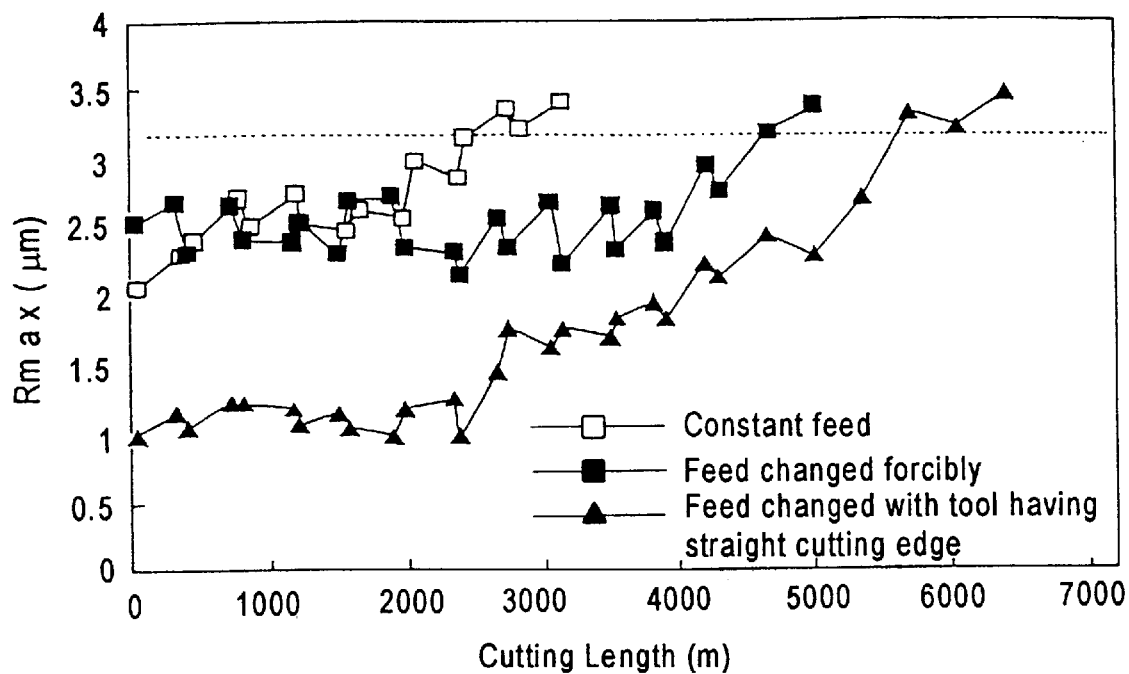
FIG. 2 is a graph showing the results of tool life comparison tests.

The measurement results of the finished surface roughness are shown in FIG. 2.

(Example 2)

Cutting was performed while changing the upper limit of feed, in the same way as in Example 1. Table 1 shows how the amount of machining before the tool life expired changes. The tool life was determined by the roughness of the finished surface. Namely, when the surface roughness got 3.2s, the tool life was judged to be over.

(Example 3)

Hardened steel was cut while changing the width of change in feed rate, in the same manner as in Example 1. Table 2 shows changes in tool life due to forced feed rate change and the dimensional changes with the changes in the width of the feed change.

(Example 4)

Figure 3:
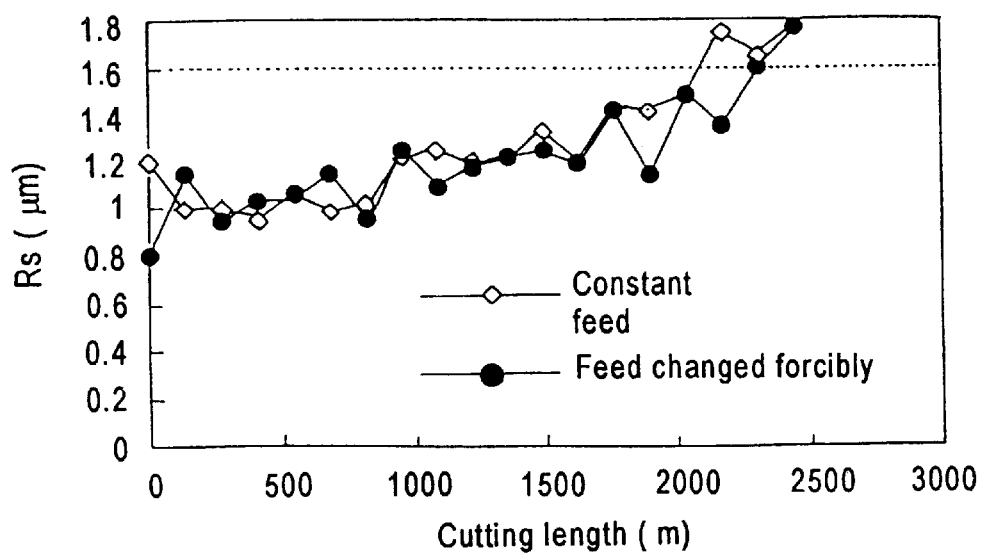
FIG. 3 is a graph showing the results of comparison tests and the effects of setting the amount of the feed rate change at a value equal to the original feed rate multiplied by an integer.

Cutting was performed for the target surface roughness of 1.6s and the target dimensional accuracy of IT6 class while forcibly changing the feed. Cutting was performed with two kinds of feeds, i.e. a constant feed of 0.06 mm/rev, and a feed in which the feed rate was forcibly changed by 0.04 mm/rev with the upper limit at 0.08 mm/rev. Specifically, the feed rate was repeatedly changed for every workpiece as follows: 0.04→0.08→0.04→0.08 (in mm/rev). Other conditions were the same as with Example 1. The measurement results of the surface roughness are shown in FIG. 3. Although the feed rate was forcibly changed, the tool life was virtually no different from the case in which the feed was constant. This is presumably because the feed rate was changed by an amount equal to the original feed rate multiplied by an integer (not within the scope of the present invention), so that it was impossible to suppress notch wear.

(Example 5)

In the same manner as in Example 1, cutting was performed using tools having different normal wedge angles. The results are shown in Table 3. The tool life was judged to have expired when the surface roughness got 3.2s and the dimensional accuracy dropped to IT 7 class.

(Example 6)

Hardened steel was cut while forcibly changing the feed rate in the same manner as in Example 1, using a tool having a straight end cutting edge with an end cutting edge angle of 2 degrees. FIG. 2 shows the measurement results of the surface roughness. The provision of the straight cutting edge having flattening effect at its tip improved the surface roughness particularly at the initial stage of cutting. The tool life also improved.

(Example 7)

Hardened steel was cut while forcibly changing the feed rate in the same manner as in Example 1 using tools having the same shape as the tool used in Example 6 but having different end cutting edge angles. The results are shown in Table 4. The tool life was judged to be over when the surface roughness got 3.2s or the dimensional accuracy dropped to IT7 class.

(Example 8)

Cutting was performed while changing the feed rate for every number (shown in Table 5) of workpieces in the same manner as in Example 1. The results are shown in Table 5. The tool life was judged to be over when the surface roughness got 3.2s or when the dimensional accuracy dropped to IT7 class.

(Example 9)

Hardened steel was cut while forcibly changing the feed in the same manner as in Example 1 using a tool having an end cutting edge portion with a straight cutting edge having an end cutting edge angle shown in Table 6 and having a length of 0.5 mm. The results are shown in Table 6. In judging the tool life, the surface roughness of 3.2s and the dimensional accuracy of IT7 class were used as criteria.

According to this invention, cutting is performed while slightly changing the feed rate under limited conditions. Thus it is possible to reliably suppress the progression of notch wear of the tool without incurring extreme fluctuations in the radial cutting force. Also it is possible to minimize dimensional changes due to change in feed rate which is especially remarkable when hardened steel is cut, while suppressing worsening of the surface roughness, thereby obtaining a finished surface with good properties.

Also the tool life extends. This is advantageous in reducing the manufacturing cost. In particular, by optimizing the tool shape according to the cutting phenomena peculiar to hardened steel, it is possible to further extend the tool life and reduce the manufacturing cost.

TABLE 1

| upper limit of feed (mm/rev) | amount of machining (ratio to the value when f = 0.09 mm/rev) |
|---|---|
| 0.12 | 0.3 |
| 0.1 | 0.95 |
| 0.09 | 1 |
| 0.05 | 0.83 |
| 0.01 | 0.74 |
| 0.004 | 0.2 |

Underlined values are outside the scope of this invention

TABLE 2

| width of change in feed rate (mm/rev) | tool life (ratio to the value when no change is made) | change in dimension (µm) |
|---|---|---|
| 0.001 | 1 | 0.1 |
| 0.002 | 1.2 | 0.5 |
| 0.005 | 1.5 | 1 |
| 0.01 | 1.8 | 2 |
| 0.02 | 2 | 5 |
| 0.04 | 1.7 | 10 |
| 0.05 | 1.5 | 19 |
| 0.06 | 1 | 50 |

Underlined values are outside the scope of this invention

TABLE 3

| normal wedge angle (degrees) | tool life (ratio to the value at 130 degrees) |
|---|---|
| 50 | 0.5 |
| 60 | 1.5 |
| 70 | 1.7 |
| 80 | 1.8 |
| 90 | 1.9 |
| 100 | 2.0 |
| 110 | 2.3 |
| 120 | 2.1 |
| 130 | 1 |

Underlined values are outside the scope of this invention

TABLE 4

| end cutting edge angle (degrees) | tool life (ratio to the value for normal shape) |
|---|---|
| 0.1 | 0.8 |
| 0.5 | 1.2 |
| 1 | 1.3 |
| 2 | 1.4 |
| 4 | 1.3 |
| 6 | 1 |

Underlined values are outside the scope of this invention

TABLE 5

| intervals at which the feed is changed (number of workpieces) | tool life (ratio to the value when the feed is changed for every five workpieces) |
|---|---|
| 1 | 0.99 |
| 3 | 0.98 |
| 5 | 1 |
| 7 | 1.02 |
| 11 | 0.97 |
| 14 | 0.32 |

When 14 workpieces were cut, the total cutting length exceeded 1000 meters. Thus, this case is outside of the scope of this invention.

TABLE 6

| end cutting edge angle (degrees) | tool life (ratio to the value for normal shape) |
|---|---|
| −0.05 | 0.24 |
| −0.01 | 1.4 |
| 0.5 | 1.45 |
| 2 | 1.42 |

TABLE 6-continued

| end cutting edge angle (degrees) | tool life (ratio to the value for normal shape) |
|---|---|
| 4 | 1.4 |
| <u>6</u> | 1 |

Underlined values are outside the scope of this invention

What is claimed is:

1. A method of cutting hardened steel by using a cBN sintered tool to achieve a target surface roughness of 3.2s or less and a dimensional accuracy of IT7 class or higher, the method comprising:

applying an initial set tool feed rate; and changing the set feed rate by an amount between 0.002 and 0.05 mm/rev for each workpiece when the cutting length for any set feed rate has reached between 10 and 1000 meters, the amount of feed rate change being other than the initial set tool feed rate multiplied by an integer;

wherein the maximum tool feed rate is selected to yield a theoretical surface roughness in a range between 2/3 and 1/1000 of the target surface roughness.

2. A method as claimed in claim 1 wherein said cBN sintered tool has a normal wedge angle of not less than 60 degrees and not more than 120 degrees.

3. A method as claimed in claim 1 wherein said cBN sintered tool has a straight end cutting edge extending from a curved nose, said end cutting edge having an end cutting edge angle of not less than 0.5 degree and not more than 4 degrees.

4. A method as claimed in claim 1 wherein said cBN sintered tool has a straight end cutting edge extending from a curved nose, said end cutting edge having a length of not less than 0.001 mm and not more than 1 mm and an end cutting edge angle of not less than −0.01 degree and not more than 4 degrees.

* * * * *